(12) United States Patent
Jain et al.

(10) Patent No.: US 7,558,463 B2
(45) Date of Patent: Jul. 7, 2009

(54) RETENTION OF INFORMATION ABOUT DIGITAL-MEDIA RIGHTS IN TRANSFORMED DIGITAL MEDIA CONTENT

(75) Inventors: Amit Jain, Sammamish, WA (US); Benjamin Brooks Cutter, Kirkland, WA (US); Brian P. Evans, Redmond, WA (US); Clifford P. Strom, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 11/108,327

(22) Filed: Apr. 18, 2005

(65) Prior Publication Data

US 2006/0232449 A1 Oct. 19, 2006

(51) Int. Cl.
*H04N 5/76* (2006.01)
*H04N 7/00* (2006.01)
*H04N 5/00* (2006.01)
(52) U.S. Cl. .................................. 386/46; 386/125
(58) Field of Classification Search ............ 386/1, 386/46, 125–126
See application file for complete search history.

(56) References Cited

U.S. PATENT DOCUMENTS

| | | | |
|---|---|---|---|
| 5,893,920 A | 4/1999 | Shaheen et al. | |
| 5,987,126 A * | 11/1999 | Okuyama et al. | 380/203 |
| 6,052,735 A | 4/2000 | Ulrich et al. | |
| 6,189,146 B1 | 2/2001 | Misra et al. | |
| 6,219,652 B1 | 4/2001 | Carter et al. | |
| 6,324,544 B1 | 11/2001 | Alam et al. | |
| 6,327,652 B1 | 12/2001 | England et al. | |
| 6,393,434 B1 | 5/2002 | Huang et al. | |
| 6,407,680 B1 | 6/2002 | Lai et al. | |
| 6,463,445 B1 | 10/2002 | Suzuki et al. | |
| 6,493,758 B1 | 12/2002 | McLain | |
| 6,542,546 B1 | 4/2003 | Vetro et al. | |
| 6,611,358 B1 | 8/2003 | Narayanaswamy | |
| 6,757,517 B2 | 6/2004 | Chang | |
| 6,772,340 B1 | 8/2004 | Peinado et al. | |
| 6,775,655 B1 | 8/2004 | Peinado et al. | |
| 6,959,348 B1 | 10/2005 | Chan et al. | |
| 6,981,045 B1 | 12/2005 | Brooks | |
| 6,983,371 B1 | 1/2006 | Hurtado et al. | |
| 7,039,643 B2 | 5/2006 | Sena et al. | |
| 7,054,335 B2 | 5/2006 | Wee et al. | |
| 7,054,964 B2 | 5/2006 | Chan et al. | |

(Continued)

FOREIGN PATENT DOCUMENTS

WO WO02/28006 4/2002

(Continued)

OTHER PUBLICATIONS

"Transcode" Online Nov. 29, 2002 retrieved from the internet: url:http://www.theorie.physik.uni-goettingen.de/{ostreich/transcode/html/intro.html retrieved Aug. 19, 2004.

(Continued)

*Primary Examiner*—Thai Tran
*Assistant Examiner*—Nigar Chowdhury
(74) *Attorney, Agent, or Firm*—Lee & Hayes, PLLC (57) ABSTRACT

Described herein are one or more implementations for transforming (e.g., transcoding) DRM-protected digital media content while retaining associated DRM-information (e.g., a user license its related information).

17 Claims, 4 Drawing Sheets

U.S. PATENT DOCUMENTS

| | | | |
|---|---|---|---|
| 7,089,309 | B2 | 8/2006 | Ramaley et al. |
| 7,111,058 | B1 | 9/2006 | Nguyen et al. |
| 7,120,873 | B2 | 10/2006 | Li |
| 7,133,925 | B2 | 11/2006 | Mukherjee et al. |
| 7,143,354 | B2 | 11/2006 | Li et al. |
| 7,155,475 | B2 | 12/2006 | Agnoli et al. |
| 7,200,680 | B2 | 4/2007 | Evans et al. |
| 7,203,620 | B2 | 4/2007 | Li |
| 7,278,165 | B2 | 10/2007 | Molaro |
| 7,290,699 | B2 | 11/2007 | Reddy et al. |
| 7,382,879 | B1* | 6/2008 | Miller .................... 380/201 |
| 7,421,024 | B2 | 9/2008 | Castillo |
| 7,433,546 | B2 | 10/2008 | Marriott et al. |
| 7,474,106 | B2 | 1/2009 | Kanno |
| 7,475,106 | B2 | 1/2009 | Agnoli et al. |
| 2001/0033619 | A1 | 10/2001 | Hanamura et al. |
| 2003/0028488 | A1 | 2/2003 | Mohammed et al. |
| 2003/0028643 | A1 | 2/2003 | Jabri |
| 2003/0126608 | A1 | 7/2003 | Safadi et al. |
| 2004/0193648 | A1 | 9/2004 | Lai et al. |
| 2004/0196975 | A1 | 10/2004 | Zhu et al. |
| 2005/0239434 | A1 | 10/2005 | Marlowe |
| 2006/0008256 | A1 | 1/2006 | Khedouri et al. |
| 2007/0058718 | A1 | 3/2007 | Shen et al. |
| 2007/0153910 | A1 | 7/2007 | Levett |

FOREIGN PATENT DOCUMENTS

| | | |
|---|---|---|
| WO | WO03/034313 | 4/2003 |
| WO | WO03/058508 | 7/2003 |
| WO | WO2004/102459 | 11/2004 |

OTHER PUBLICATIONS

"SoX—Sound eXchange" Internet Dec. 12, 2003 retrieved from url:http://web.archive.org/web/20031212170807/http://sox.sourceforge.net retrieved on Aug. 16, 2004.

"Transcoding: Extending e-buisness to new environments" Internet Nov. 6, 2002 Retrieved from URL:http://researchweb.watson.ibm.com/journal/sj/401/britton.html retrieved Aug. 19, 2004.

Britton, "Transcoding: Extending E-Business to New Environments"; IBM Systems Journal, 2001, vol. 40, No. 1; pp. 153-178.

Chandra, et al., "Application-Level Differentiated Multimedia Web Services Using Quality Aware Transcoding"; IEEE Journal on Selected Areas of Communications, Dec. 2000; vol. 18, No. 12; pp. 2544-2564.

"An Adaptive Web Content Delivery System" Internet May 21, 2000 Retrieved from the Internet URL:http://research.microsoft.com/asia/dload_files/g-mcomputing/MediaCom2/v5.pdf retrieved Aug. 20, 2004.

Chen, et al, "Mobile EE-an Interprise Mobile Service Platform"; Wireless Networks, 2003; vol. 9, No. 4; pp. 283-297.

Pervasive WEb Content Delivery with Efficient Data Reuse Internet Aug. 1, 2002 retrieved from url:http//2002.iwcw.org/papers/18500120.pdf retrieved on Aug. 16, 2004.

"The Multitasking Mindset Meets the Operating System" EDN Electrical Design News Cahners Publishing Co. Newton Massachusetts vol. 35 No. 20 Oct. 1, 1990.

Huang, et al., "A Frame-Based MPEG Characteristics Extraction Tool and Its Application in Video Transcoding"; IEEE Transaction on Consumer Electronics, Aug. 2002; vol. 48, No. 3; pp. 522-532.

Lee, et al., "Data Synchronization Protocol in Mobile Computing Environment Using SyncML"; HSNMC 2002 5th IEEE International Conference on High Speed Networks and Multimedia Communications, 2002; pp. 133-137.

Nikkei Electronics, "Contents Transcoding Technology is Now Spotlighted as 'Lubricant' for Online Digital Distribution"; vol. 775, 2000, pp. 57-62.

"Multimedia Content Adaptation for QoS Management over Heterogeneous Networks" Internet May 11, 2001 retrieved Aug. 18, 2004.

"Caching Strategies in Transcoding-enabled Proxy Systems for Streaming Media Distribution Networks" Internet Dec. 10, 2003 Retrieved from URL:http://www.hpl.hp.com/techreports/2003/HPL-2003-261.pdf retrieved on Aug. 19, 2004.

Singh, "PTC: Proxies that Transcode and Cache in Heterogeneous Web Client Environments"; Proceedings of the Third International Conference on Web Information Systems, 2002; pp. 11-20.

"Context-based media Adaptation in Pervasive Computing" Internet May 31, 2001 Retrieved from url:http://www.mcriab.uottawa.ca/papers/Ryan_paper.pdf retrieved on Aug. 19, 2004.

Kassler et al., "Generic QOS Aware Media Stream Transcoding and Adaptation," Dept. of Distributed Systems, University of Ulm, Germany, 10 pages.

DRM Watch Staff, "Microsoft Extends Windows Media DRM to Non-Windows Devices," DRM Watch, May 7, 2004, 2 pages.

Lee, Yui-Wah et al., "Gamma: A Content-Adaptation Server for Wireless Multimedia Applications," Bell Laboratories, Holmdel, NJ USA, pp. 1-36.

IHDE, Steven C. et al., "Intermediary-based Transcoding Framework," printed Apr. 18, 2005, pp. 1-3.

LightSurf Technologies, "LightSurf Intelligent Media Optimization and Transcoding," printed Apr. 18, 2005, 1 page.

Digital 5, "Media Server," printed Apr. 18, 2005, 2 pages.

Nikkei Electronics, "Contents Transcoding Technology is Now Spotlighted as 'Lubricant' for Online Digital Distribution"; vol. 775, 2000, pp. 57-62.

"Context-based media Adaptation in Pervasive Computing" Internet May 31, 2001 Retrieved from url:http://www.mcrlab.uottawa.ca/papers/Ryan_paper.pdf retrieved on Aug. 19, 2004.

* cited by examiner

RETENTION OF INFORMATION ABOUT DIGITAL-MEDIA RIGHTS IN TRANSFORMED DIGITAL MEDIA CONTENT

TECHNICAL FIELD

This invention generally relates to a digital media technology that transforms protected digital media content.

BACKGROUND

As digital media technology continues to advance and the cost of storage continues to decline, users increasingly host and consume digital media content on their own primary computers (e.g., desktop PCs). Examples of such digital media include music, video, still images, and so on. So, this means that increasingly users are listening to digital music, watching digital video, and viewing still images (e.g., photographs) on their home or business computers.

At the same time, the corresponding increase in the availability of portable media-playback devices such as personal digital assistants (PDAs), digital media players (e.g., so-called "MP3 players"), hand-held computers, laptop computers, and smart phones is providing users more ubiquitous access to digital media content than ever. As users rely more and more on such portable computing devices, there is a growing need for applications that effectively transfer digital media from source devices, such as primary computers, to the portable devices.

However, the existence of the multitude of media content formats complicates the transference of digital media content from source devices to target media-playback devices. This multitude of media content formats raises issues about format compatibility with target media-playback devices and management of legal rights for transferred media content.

Digital media content typically exists in a specified "format." Herein, a "format" of digital media content includes its specific pre-established arrangement or organization of media data in computer-readable storage media. In addition, media data is typically compressed (and later decompressed) using a specific compression/decompression ("codec") algorithm. Because a media format and its specified codec are often closely associated, the line between them is often blurred. Herein, unless the context indicates otherwise, references to the "format" of digital media content includes the codec associated with compressing/decompressing the content as well as the content's specific pre-established arrangement or organization of media data in computer-readable storage media.

Transcoding Media Content

Typically, a media-playback device is designed to handle one or more specific formats of the digital media content ("formatted-media-content"). Due to space, processing-power, memory, and licensing constraints, these playback devices typically have a limited set of compatible formats. Often a device manufacturer licenses the technology for playing formatted-media-content in a proprietary format, such as those formats listed above. Sometimes, the device manufacturer implements its own proprietary format technology.

Since a target playback device typically employs a different or slightly altered format than does the source device (e.g., desktop PC), the format of formatted-media-content is typically altered before being transferred from the source device to the target device. This format-alteration is commonly called "transcoding."

A transcoding process may include, for example, converting a formatted-media-content from one format to another (e.g., MP3 to WMA) so the newly formatted content will play on the playback device. Furthermore, a transcoding process may include, for example, down-sampling the formatted-media-content to a lower bit rate to reduce the amount of storage space needed on the playback device, or adapting the screen size of the formatted-media-content so video appears correctly on the playback device.

When transcoding, the formatted-media-content is sometimes converted into a format having lower processing requirements for decoding. A formatted-media-content configured for playback on a full-scale "desktop" computer may be too complex to decode effectively on a device with a lower-powered processor, such as a portable media-playback device. Furthermore, when transcoding, the formatted-media-content is sometimes converted into a specific format (e.g., a proprietary format) employed by the target media-playback device.

Digital Rights Management

Another consideration complicating the transference of digital media content is a desire to maintain protection of the intellectual property rights in the media content owned by the vender, publisher, owner, and/or author of the content. "Digital rights management" or "digital restrictions management" (DRM) seeks to manage ownership and distribution rights for media content from its creation to its consumption.

While some of the existing digital media content format do not support DRM protection, many of the existing format do support DRM protection to some degree. Typically, a DRM-protected format is associated with one or more particular DRM products and/or standards. MPEG-4 has been actively developing a DRM standard, the Intellectual Property Management and Protection (IPMP) protocol. Several commercial DRM products are also currently available, such as MICROSOFT® WINDOWS MEDIA® RIGHTS MANAGER (WMRM) (Microsoft Corporation, Redmond, Wash.).

A DRM system such as WMRM encrypts and packages digital media content into a digital media file for super-distribution. A decryption key is uploaded to a license server along with a specification of license rights selected by the vender. To play protected content, a user first acquires a license (e.g., from the proper license server) that contains the decryption key and user access rights. A license includes the decryption key that decrypts the encrypted digital content and a description of the license rights (e.g., play, copy, etc.) conferred by the license and related conditions (e.g., begin date, expiration date, number of plays, etc.). A license to use the content is individualized and typically encrypted in such a way that the key binds to the user's hardware, making it difficult for the license to be used by others illegally.

With a DRM-protected media content, a licensed user is allowed to perform DRM-managed actions on the protected media content. In addition, a DRM system may limit the type and the extent (e.g., how many times or how often) that the user performs DRM-managed actions on the protected media content. Examples of DRM-managed actions include:

play the content;
    copy the content;
    transcode or convert the content;
    transfer the content to a portable playback device;
    "burn" the content to a compact-disc (CD) or other computer-readable media.

With conventional multimedia products, the DRM information of DRM-protected media content is lost once the content is transcoded (or generally, transformed).

SUMMARY

Described herein are one or more implementations for transforming (e.g., transcoding) DRM-protected digital media content while retaining associated DRM-information (e.g., a user license and its related information).

BRIEF DESCRIPTION OF THE DRAWINGS

The same numbers are used throughout the drawings to reference like elements and features.

DETAILED DESCRIPTION

One or more implementations, described herein, transforms (e.g., transcoding) DRM-protected digital media content while retaining associated DRM-information (e.g., a user license its related information). For example, a source device (e.g., a desktop computer) may have DRM-protected media content (e.g., music or video) for which a user has an associated DRM license. The user may wish to transfer the DRM-protected media content to a target media-playback device (e.g., a MP3 player). However, a transformation (e.g., transcoding) often precedes the transfer the media content into a new format—one which is better suited to the target media-playback device.

With the one or more implementations, described herein, the user's license (and other DRM-information) is retained with the transformed content. Consequently, the same original license for the source content controls the transformed content as well. For instance, assume the user's license only allow the user to play the content ten times and the user had already played the source content six times, thus leaving the user four more plays of the content. Because the DRM-information, the user may play the transformed only four times, in this example. This exemplary information includes the license, the type of license (e.g., limited number of plays) and its associated information (e.g., the content has been played six times).

Exemplary Environment for Transformation with DRM-Info Retention

Figure 1:
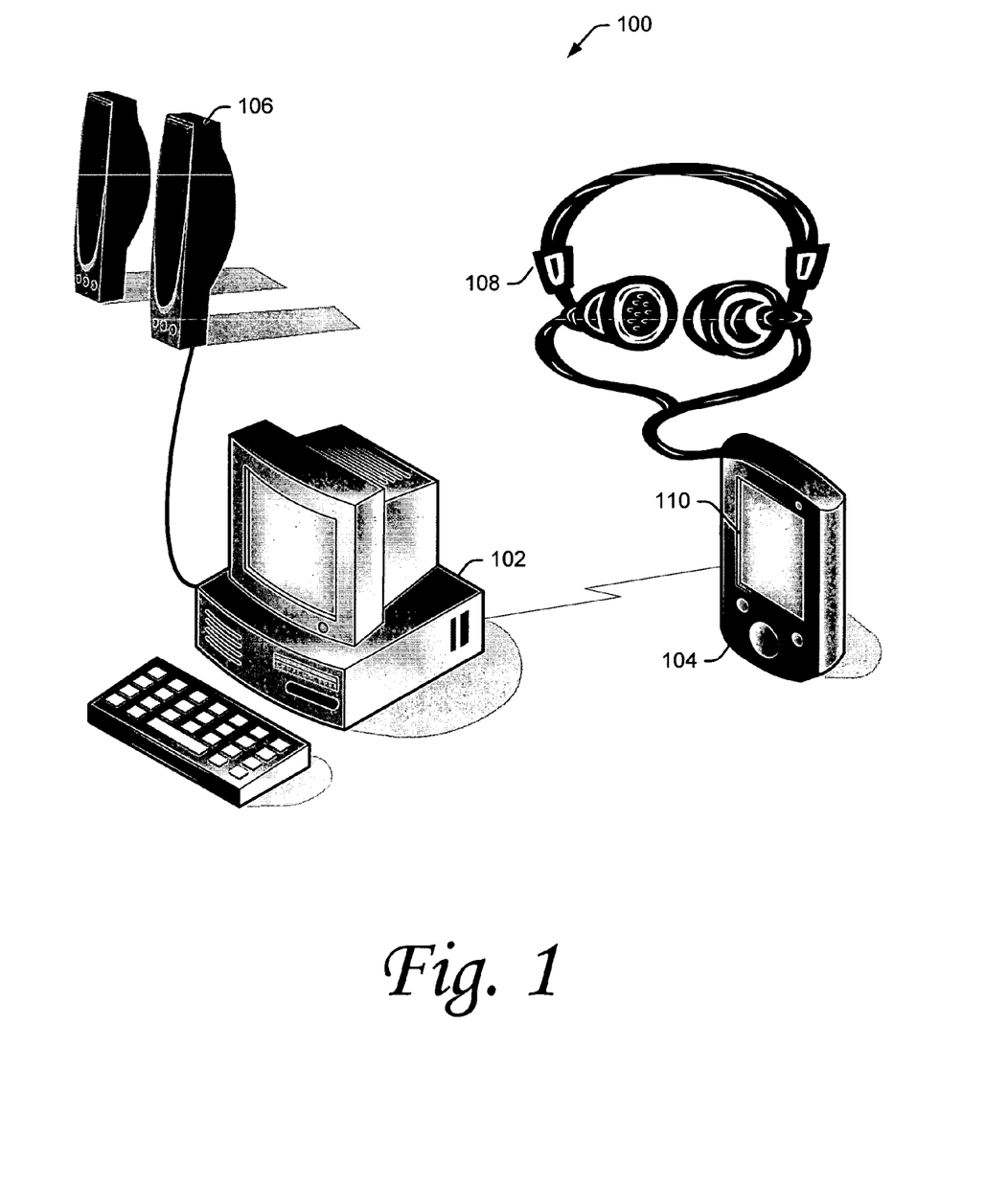
FIG. 1 illustrates an exemplary environment in accordance with one or more implementations described herein.

FIG. 1 illustrates an exemplary environment 100 suitable for one or more implementations described herein. As depicted, FIG. 1 illustrates a source computing device 102 in anticipation of transferring digital media content to a subsequently coupled target media-playback device 104.

The source computing device 102 typically has speakers 106 or headphones for rendering the audio portions of its digital media content. The target media-playback device 104 typically has headphone 108 or speakers for rendering the audio portions of the transferred digital media content. The target device 104 may also have a display screen 110 for rendering still and/or motion images of the transferred digital media content. The exemplary environment 100 generally illustrates a source-target media content transfer (also called "synchronization") scenario in which the target playback device 104 is coupled to the source device 102 for transferring digital media content to the target device.

Figure 4:
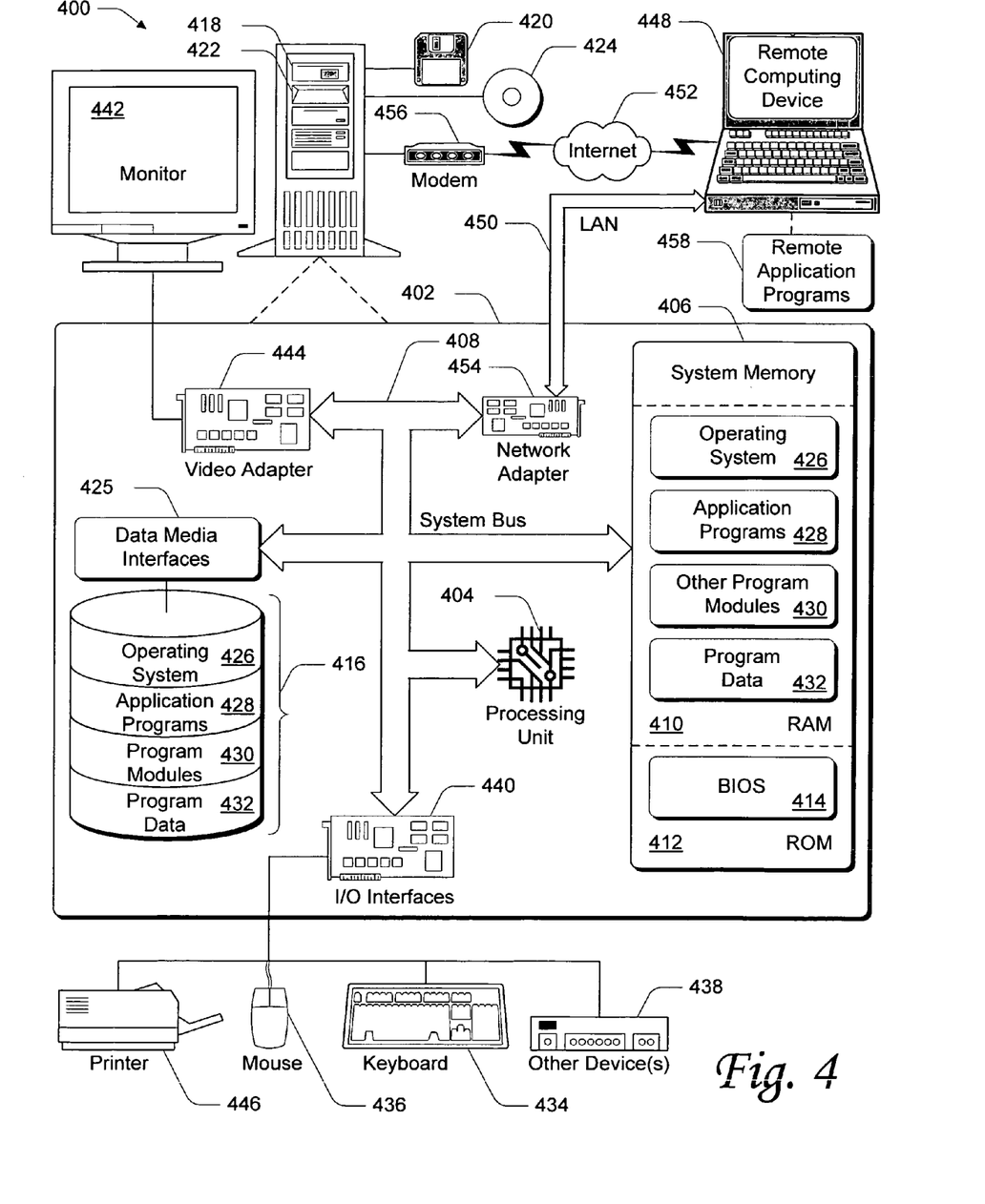
FIG. 4 is an example of a computing operating environment capable of (wholly or partially) implementing at least one embodiment described herein.

The source computing device 102 is typically implemented as a user's primary computing device, such as a desktop personal computer (PC). Source device 102 might also be implemented as other conventional computing devices generally configured to receive and render multi-media content from various sources, and/or to reformat such content for synchronization and playback on a target playback device 104. An example of a source-computing device 102 is depicted in FIG. 4 and described in detail below in the Exemplary Computing Environment section.

Target media-playback device 104 may be implemented as any one of numerous digital media player devices available from various manufacturers. Such devices are, for example, configured to store and play back audio data in the form of variously formatted music files, such as MP3 (MPEG-1 Audio Layer 3) files and WMA (Windows Media Audio) files. Some playback devices are also configured to store and play back video data in the form of variously formatted video files, such as MPEG-4 files and WMV (Windows Media Video) files. Therefore, examples of the target media-playback device 104 may include various general-purpose laptop and notebook computers configured to playback media content, in addition to devices that are more specifically designed to play back various forms of multimedia.

These exemplary scenarios herein (such as the one above) discuss transcoding media content and transferring that transcoded media content to a target device. However, this is just one example scenario. One or more implementations may involve another form of transformation other than transcoding. One or more implementations might not employ transference to a target device. Therefore, one should not assume all implementations would employ device transference because of the discussion of a source and/or a target device in the exemplary scenarios herein.

Exemplary Embodiments for Transformation with DRM-Info Retention

Figure 2:
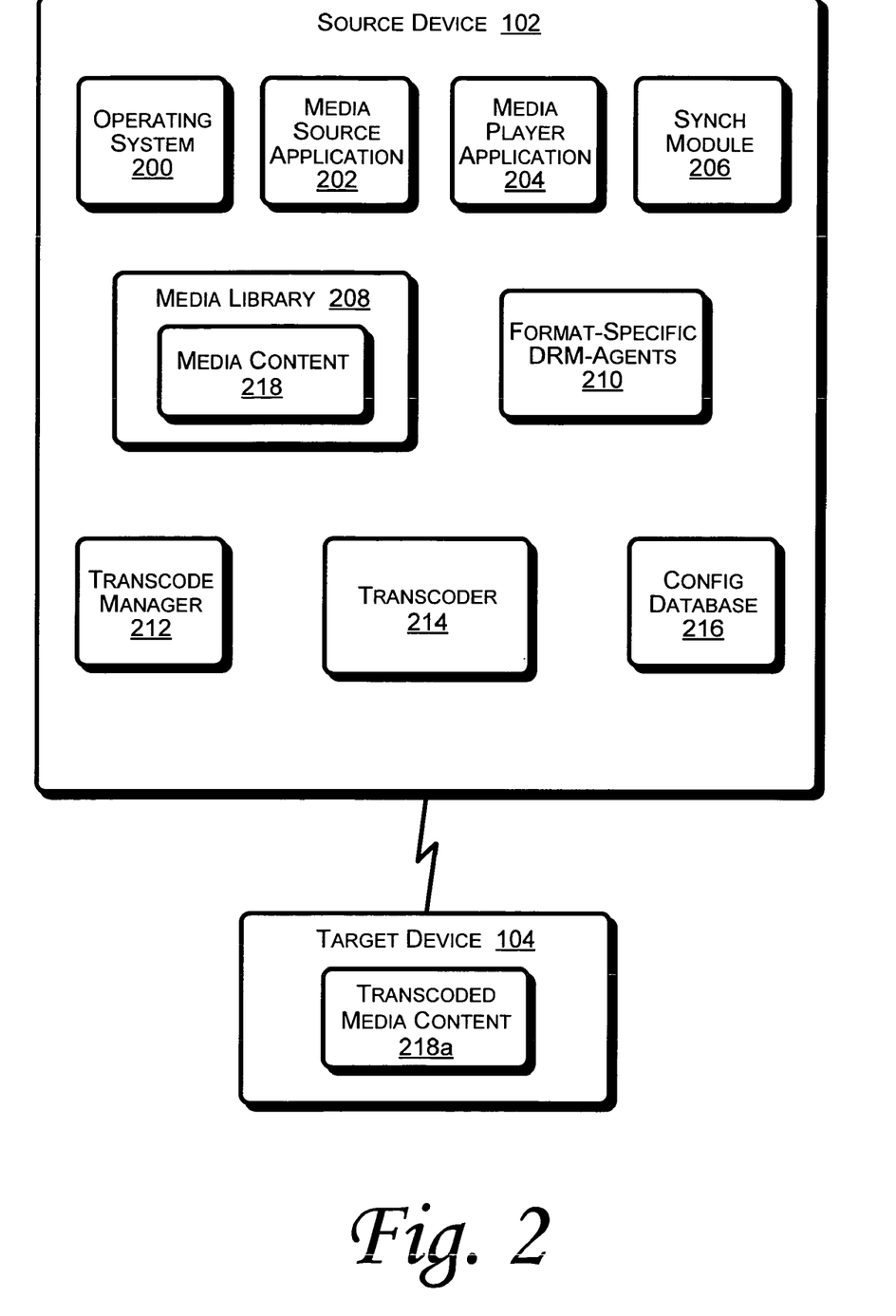
FIG. 2 illustrates a block diagram representation of an exemplary source device in accordance with one or more implementations described herein.

FIG. 2 illustrates a block diagram representation of the exemplary source device 102 that is suitable for one or more implementations described herein. Various components on the source device 102 facilitate the retrieval and management of digital media content for the general purpose of rendering the content on source device 102 and/or synchronizing the content with a target playback device 104.

These components include an operating system 200, one or more media-source applications 202, a media-player application 204, a media-content synchronization program module 206, a media library 208, a digital-rights manager 210, a transformation manager 212, and a transformer 214. These components are embodied on one or more processor-readable media, such as a primary memory of a computer. Although these components are illustrated separately on the source device 102, it is noted that any one or more of these components may be implemented on the source device 102 as part of integrated product. For example, one or more of these components may be implemented as part of a multimedia software product, the operating system 200, or as stand-alone components.

The media-source application 202 may be one or more of various applications and/or tools configured to receive, retrieve, and/or access media content. For example, the media-source application 202 may be a digital audio application that facilitates the downloading of digital audio via, for example, the Internet. The media-source application 202 may be an interactive TV service application that facilitates the recording of video (e.g., TV programming) directly off of a cable and/or satellite feed, a video capture component to transfer home video footage from a digital video recorder onto source device 102, a Web browser application that facilitates downloading media off the Internet, and so on. Such media-source applications 202 typically supply various forms of media content 218 to a media library 208 on source device 102. Thus, media content 218 stored in the media library 208 may include, for example, audio files in the form of MP3 and WMA files, video files in the form of DVR-MS, WMV, AVI and MOV files, and image files in the form of GIF and JPEG files.

The media-player application 204 is typically a desktop-based application player that manages a broad range of multimedia related tasks. A media-source application 202 may also include or be part of a media-player application 204. The media-player application 204 may handle, for example, streaming audio and video, CD/DVD playback, MP3 and WMA support, encoding, CD/DVD burning, Internet radio, and the like. A media-player application 204 may also offer Web browser integration so it can be embedded in a browser enabling multi-tasking during streaming video. Like other media-source applications 202, a media-player application 204 may supply various forms of media content 218 (e.g., audio files, video files, image files, etc.) to the media library 208 on source device 102.

The media-content synchronization program module 206 ("synch module") provides a user-configurable model for facilitating the transfer of a subset of the digital media content 218 in the media library 208 to one or more target devices 104 from on source device 102. The synch module 206 may be part of the media-player application 204, be part of the operating system 200, or be a stand-alone component.

In addition, the synch module 206 works in cooperation with the transformation manager 212 and transformer 214 to transform (e.g., transcode) digital media content if necessary or desirable. After transforming, the synch module 206 transfers transformed media content 218a from the source device 102 to the connected target playback device 104.

The media library 208 contains digital media content 218, such as audio, video, text, or image files. The media content 218 may also include a static or automated playlist of files (e.g., audio, video, and images) or any grouping of files or data. The synch module 206 may assign a transfer priority to media content 218 in the media library 208 to indicate their relative importance or desirability to the user.

The digital-rights manager 210 manages the digital rights associated with DRM-protected media content. For example, a user may have a license for DRM-protected content that allows the user to "burn" it to a CD (or other computer-readable media) twice. Typically, the licensed media content is stored in a DRM-enabled format that includes license information (e.g., metadata). This information typically "points" to a decryption key stored in a protected DRM data storage location. The metadata may also include information related to the status of permitted use.

For example, assume that the user may "burn" the content to a CD up to two times. After that, the digital-rights manager 210 will not authorize the user to "burn" the content again because she has exceed the license. The digital-rights manager 210 tracks and stores permitted-use (e.g., user may burn the content to two CDs) and other status information for the media content.

For example, references herein to DRM-information of a digital media content includes some or all of the following data associated with the media content: licenses, decryption keys, pointers to decryption key, license types, permitted-use status information, other status information, content metadata, license metadata, and any other tracked DRM-related data.

Herein, the digital-rights manager 210 confirms existence of a valid license for DRM-protected media content. A license is valid when the license for the associated user/machine exists, permits the requested action, and there are no limiting restrictions such as expiration dates, or expired use counts. If so, the digital-rights manager 210 authorizes the performance the desired action. Furthermore, the digital-rights manager 210 may perform DRM functions that include compression/decompression and/or encryption/decryption of a DRM-protected media content so that the content may be subsequently "played." "transcoded," etc The transformation manager 212 facilitates transformation of media content 218. Primarily, the transformation manager 212 interacts with the digital-rights manager 210 to determine if a transformation is authorized. If authorized, the transformation manager 212 directs the transformer 214 to perform the desired transformation. The transformation manager provides the transformer with information necessary for transformation, such as identity/location of the media content 218 in the media library 208 and licensing information so that the transformer can link the transformed content back to is original license.

The transformer 214 performs transformation of the subject DRM-protected media content under the direction of the transformation manager 212. Herein, "transformation" of digital media content expressly includes "transcoding."

The process of transcoding media content (e.g., "media files") is well-known and may include (depending on device capabilities), for example, converting a media file from one format to another (e.g., MP3 to WMA) so the file will play on the target playback device 104, down-sampling a media file to a lower bit rate for compatibility with the target device and to reduce the amount of storage space needed on the target device, and adapting the screen size of a video file so the video plays back correctly on the target playback device. Transcoding is often used to convert a media file to a format having lower CPU requirements for decoding, since "desktop" content may be too complex to decode effectively on a device with a lower-powered processor, such as a portable media playback device. Transcoding can also include various other processes for altering media files, and those mentioned herein are included by way of example only and not by way of limitation. Thus, other examples of transcoding include altering the word length of individual data samples (e.g. 24 bit to 16 bit), independently of the actual bit rate, altering the complexity profile of the encoder portion of the transcoding process to a more complex or more simple resultant file for purposes of managing CPU requirements at the destination device, and changing representative color spaces between the source and destination files as required by the target device (e.g. YUV to RGB, or vice versa).

However, as understood herein, transforming includes other actions that alter, modify, change, convert, and/or adapt the digital media content and/or the format of that content. For example, transforming may include altering content packet sizes may so that devices with memory constraints may more readily load and parse media content.

Methodological Implementation

Figure 3:
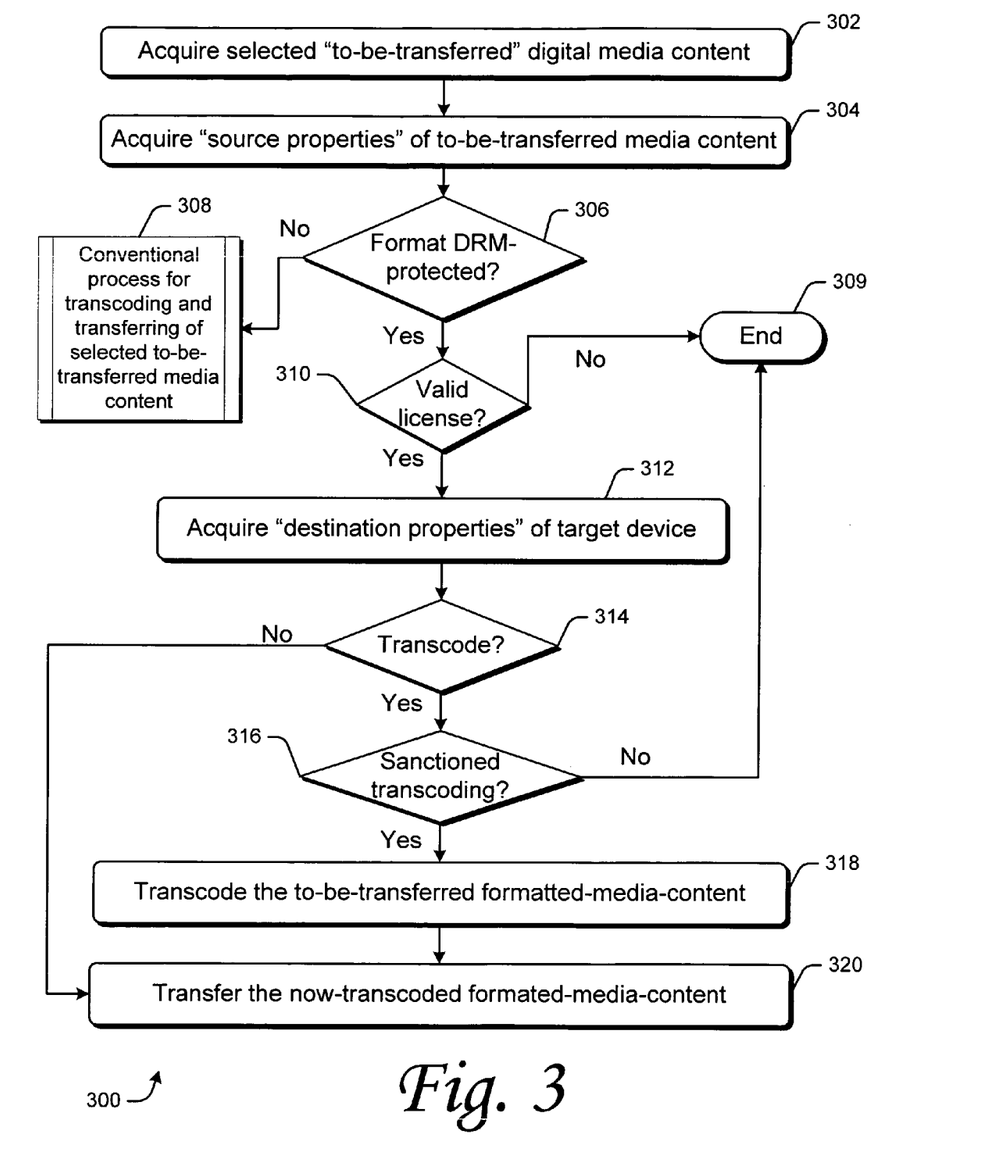
FIG. 3 illustrates a flow diagram showing a methodological implementation described herein.

FIG. 3 shows method 300 for transforming DRM-protected media content while retaining associated DRM-information. This method 300 is performed by the one or more of the various components as depicted in FIG. 2. Furthermore, this method 300 may be performed in software, hardware, or a combination thereof. For ease of understanding, this method is delineated as separate steps represented as independent blocks in FIG. 3; however, these separately delineated steps should not be construed as necessarily order dependent in their performance. Additionally, for discussion purposes, the method 300 is described with reference to FIG. 2. Also for discussion purposes, particular components are indicated as performing particular functions; however, other components (or combinations of components) may perform the particular functions.

At 302 of FIG. 3, the transformation manager 212 (or some other component of the source device 102) obtains a particular media file, which is a manifestation of subject digital media content. The user may have manually selected this subject media content for transformation. However, more likely scenario is when the user manually selects this subject content for transfer to a target device 104.

At 304, the transformation manager 212 determines whether the format of the subject media content is DRM-protected. If the subject media content is not DRM-protected, then this method proceeds to a conventional process for transferring and transforming unprotected media content at 306. Otherwise, the subject media content is DRM-protected and the method proceeds to 308.

At 308, the digital-rights manager 210 locates a license associated with the subject media content. Finding the license may involve accessing data at one or more locations. For example, the format of the subject media content may include a link to a license key located in a secured DRM data storage.

At 310, the digital-rights manager 210 determines if a license is valid. The digital-rights manager 210 may use this stored key to determine if the license is valid. Furthermore, the digital-rights manager 210 will analyze the other DRM-information to determine if the user is permitted to perform the desired use (e.g., transformation). If the license is not valid (or does not exist at all), then this method ends at 312 because the user does not have a valid license to use the subject media content. Otherwise, a license is valid and the method proceeds to 314.

At 314, the synch module 206 acquires the "destination properties" of the target device 104. Those properties include the "specified format" for the media content.

At 314, the transformation manager 212 accesses the actual content (in the clear) of the subject DRM-protected media content. Access may be achieved by the digital-rights manager 210 decrypting the subject media content.

At 316, the transformer 214 transforms the now-clear media content. Again, an example of such a transformation is transcoding.

At 318, the transformation manager 212 re-encrypts the transformed content of the subject DRM-protected media content. The encryption itself may be performed by the digital-rights manager 210. Before or during the encryption, the DRM-information of the original (e.g., non-transformed) subject media content is inserted. In some implementation, the DRM-information itself is not inserted. Rather, data pointing or linking to the associated DRM-information is inserted.

The DRM-information is provided by blocks 308 and/or 310. Those block may temporarily store the DRM-information for later use by block 318. The transformation manager 212 may query the digital-rights manager 210 for the associated DRM-information.

Consequently, the transformed subject media content retains the same degree of DRM protection and control afforded to the original (and non-transformed) subject content. Both contents (i.e., the non-transformed and the transformed) effectively share the same license.

In some instances, advances in DRM technology necessitate a conversion of the actual license (and its format and associated data) of subject media content. In those instances, the transformed subject content is linked to (or includes) DRM-information in a new format or regarding a replacement license.

At 320, the synch module 206 transfers the now-transformed subject media content to the target device 104. Unlike conventional approaches, this transformed media content retains its associated DRM-information, such as licensing status information.

Exemplary Computing System and Environment

FIG. 4 illustrates an example of a suitable computing environment 400 within which an exemplary DRM-info retaining transformation manager, such as the components of the source device 102, as described herein, may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The exemplary DRM-info retaining transformation manager may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary DRM-info retaining transformation manager may be described in the general context of computer-executable instructions, such as program modules, being executed by a computer. Generally, program modules include routines, programs, objects, components, data structures, etc. that perform particular tasks or implement particular abstract data types. The exemplary DRM-info retaining transformation manager may also be practiced in distributed computing environments where tasks are performed by remote processing devices that are linked through a data-communications network. In a distributed computing environment, program modules may be located in both local and remote computer storage media including memory storage devices.

The computing environment 400 includes a general-purpose computing device in the form of a computer 402. The components of computer 402 may include, but are not limited to, one or more processors or processing units 404, a system memory 406, and a system bus 408 that couples various system components, including the processor 404, to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 402 typically includes a variety of computer-readable media. Such media may be any available media that is accessible by computer 402 and includes both volatile and non-volatile media, removable and non-removable media.

The system memory 406 includes computer-readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 may be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electronically erasable programmable read-only memory (EEPROM), and the like, may also be utilized to implement the exemplary computing system and environment.

Any number of program modules may be stored on the hard disk 416, magnetic disk 420, optical disk 424, ROM 412, and/or RAM 410, including, by way of example, an operating system 426, one or more application programs 428, other program modules 430, and program data 432.

A user may enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device may also be connected to the system bus 408 via an interface, such as a video adapter 444. In addition to the monitor 442, other output peripheral devices may include components, such as speakers (not shown) and a printer 446, which may be connected to computer 402 via the input/output interfaces 440.

Computer 402 may operate in a networked environment using logical connections to one or more remote computers, such as a remote computing device 448. By way of example, the remote computing device 448 may be a personal computer, a portable computer, a server, a router, a network computer, a peer device or other common network node, and the like. The remote computing device 448 is illustrated as a portable computer that may include many or all of the elements and features described herein, relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. Such networking environments may be wired or wireless.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which may be internal or external to computer 402, may be connected to the system bus 408 via the input/output interfaces 440 or other appropriate mechanisms. It is to be appreciated that the illustrated network connections are exemplary and that other means of establishing communication link(s) between the computers 402 and 448 may be employed.

In a networked environment, such as that illustrated with computing environment 400, program modules depicted, relative to the computer 402 or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computing device 402, and are executed by the data processor(s) of the computer.

Computer-Executable Instructions

An implementation of an exemplary DRM-info retaining transformation manager may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 4 illustrates an example of a suitable operating environment 400 in which an exemplary DRM-info retaining transformation manager may be implemented. Specifically, the exemplary DRM-info retaining transformation manager(s) described herein may be implemented (wholly or in part) by any program modules 428-430 and/or operating system 426 in FIG. 4, or a portion thereof.

The operating environment is only an example of a suitable operating environment and is not intended to suggest any limitation as to the scope or use of functionality of the exemplary DRM-info retaining transformation manager(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Computer-Readable Media

An implementation of an exemplary DRM-info retaining transformation manager may be stored on or transmitted across some form of computer-readable media. Computer-readable media may be any available media that may be accessed by a computer. By way of example, computer-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, data structures, program modules, or other data in a modulated data signal, such as carrier wave or other transport mechanism. Communication media also includes any information delivery media.

CONCLUSION

The techniques, described herein, may be implemented in many ways, including (but not limited to) program modules, general- and special-purpose computing systems, network servers and equipment, dedicated electronics and hardware, and as part of one or more computer networks. The techniques may, for example, be implemented on a computer system depicted in FIG. 4.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method comprising:
    facilitating selection of subject digital media content;
    in response to a determination that the subject digital media content is configured for management by digital rights management technology ("DRM-protected"), performing:
        decrypting the DRM-protected subject digital media content, the DRM-protected subject digital media content having associated digital rights management information ("DRM-information");
        transforming the decrypted subject digital media content into transformed digital media content, wherein the transforming is one of converting the subject digital media content from one format to another, down-sampling the subject digital media content to a lower bit rate, or adapting a screen size associated with the subject digital media content;
        after the transforming, inserting the DRM-information or data that links or points to the DRM-information with the transformed digital media content; and
        after the inserting, encrypting the transformed digital media content and the DRM-information or data.

2. A method as recited in claim 1, wherein the associated DRM-information comprises a digital rights management license ("DRM-license") associated with the subject digital media content, the method further comprising performing the transforming and associating in response to a determination that the associated DRM-license for the subject digital media content is valid.

3. A method as recited in claim 1 further comprising transferring the transformed digital media content from a source device to a coupled target media-playback device.

4. A method as recited in claim 1, wherein the transforming comprises transcoding the subject digital media content into transformed digital media content.

5. A method as recited in claim 1, wherein the DRM-information is linked to by the transformed digital media content, effectively sharing the same DRM-information between the subject and transformed media contents even after the transforming and associating.

6. A method as recited in claim 1, wherein DRM-information includes data selected from a group consisting of a DRM-license, a DRM-license type, and DRM-license status information.

7. A method as recited in claim 1, wherein the digital media content is selected from a group consisting of digital audio, digital still images, and digital video.

8. A method comprising:
    decrypting DRM-protected subject digital media content, the DRM-protected subject digital media content being configured for management by digital rights management technology ("DRM-protected") and having associated digital rights management information ("DRM-information");
    transforming the decrypted subject digital media content into transformed digital media content, wherein the transforming is one of converting the subject digital media content from one format to another, down-sampling the subject digital media content to a lower bit rate, or adapting a screen size associated with the subject digital media content;
    after the transforming, inserting the DRM-information or data that links or points to the DRM-information with the transformed digital media content; and
    after the inserting, encrypting the transformed digital media content and the DRM-information or data.

9. A method as recited in claim 8 further comprising facilitating selection of subject digital media content.

10. A method as recited in claim 8 further comprising performing the transforming and associating in response to a determination that the subject digital media content is DRM-protected.

11. A method as recited in claim 8 further comprising locating a digital rights management license ("DRM-license") associated with the subject digital media content.

12. A method as recited in claim 8, wherein the associated DRM-information comprises a DRM-license associated with the subject digital media content, the method further comprising performing the transforming and associating in response to a determination that the associated DRM-license for the subject digital media content is valid.

13. A method as recited in claim 8 further comprising transferring the transformed digital media content from a source device to a coupled target media-playback device.

14. A method as recited in claim 8, wherein the transforming comprises transcoding the subject digital media content into transformed digital media content.

15. A method as recited in claim 8, wherein the DRM-information is linked to by the transformed digital media content, effectively sharing the same DRM-information between the subject and transformed media contents even after the transforming and associating.

16. A method as recited in claim 8, wherein DRM-information includes data selected from a group consisting of a DRM-license, a DRM-license type, and DRM-license status information.

17. A method as recited in claim 8, wherein the subject digital media content is selected from a group consisting of digital audio, digital still images, and digital video.

* * * * *